United States Patent [19]
Nogarede

[11] Patent Number: 5,872,416
[45] Date of Patent: *Feb. 16, 1999

[54] SURFACE ACOUSTIC WAVE MACHINE

[75] Inventor: Bertrand Nogarede, Toulouse Cedex, France

[73] Assignee: Crouzet Automatismes, Valence, France

[*] Notice: This patent issued on a continued prosecution application filed under 37 CFR 1.53(d), and is subject to the twenty year patent term provisions of 35 U.S.C. 154(a)(2).

[21] Appl. No.: 528,637

[22] Filed: Sep. 14, 1995

[30] Foreign Application Priority Data

Sep. 16, 1994 [FR] France .................................. 94 11339

[51] Int. Cl.⁶ .................................................. H01L 41/08
[52] U.S. Cl. ........................... 310/323; 310/322; 310/316
[58] Field of Search .................................. 310/323, 322, 310/321, 316

[56] References Cited

U.S. PATENT DOCUMENTS

| | | | |
|---|---|---|---|
| 4,794,294 | 12/1988 | Shimizu et al. | 310/316 |
| 5,173,631 | 12/1992 | Suganuma | 310/316 |
| 5,461,273 | 10/1995 | Kawasaki et al. | 310/316 |
| 5,493,164 | 2/1996 | Nogarede | 310/323 |

*Primary Examiner*—Clayton LaBalle
*Assistant Examiner*—Timothy A. Williams
*Attorney, Agent, or Firm*—Plevy & Associates

[57] ABSTRACT

A rotating machine comprises a stator that is excited to vibrate to generate progressive surface waves at a frequency within a resonance frequency range of a predetermined rank. The rotor is designed so that the vibrations in the stator generate vibrations of the same frequency and of lower magnitude. A vibration sensor is mounted on the rotor to provide a signal. The difference in frequency between the excitation frequency of the stator and the vibration frequency detected on the rotor corresponds to the rotation speed of the rotor.

7 Claims, 2 Drawing Sheets

SURFACE ACOUSTIC WAVE MACHINE

BACKGROUND OF THE INVENTION

1. Field of the Invention

The present invention relates to surface acoustic wave machines.

2. Discussion of the Related Art

Surface acoustic wave motors have been described, for example, in U.S. Pat. No. 4,562,374 of T. Sashida. The operation principle of such a motor is illustrated in the attached FIG. 1 that reproduces FIG. 1 of the Sashida patent. A progressive surface wave of the Rayleigh wave type generated at the surface of a fixed elastic body 1 causes ripples at the surface of this body. If a movable part 2 is urged against the body 1, the part 2 is driven by the displacement of apices A–A' of these ripples. Apices A–A' follow an elliptic path Q and their transversal displacement speed is associated with the oscillation frequency and with the amplitude of their displacement. In practice, the excitation frequency of the surface waves should be close to a resonance frequency of the body at the surface of which these waves are to be provided. This frequency can be modified only within a small range if it is desired to maintain a non negligible amplitude (for example approximately 10 micrometers) of the displacements of the apices perpendicularly to the surface in which these ripples are generated. A small difference in frequency with respect to the resonance frequency generates a high amplitude variation. Thus the relation between the displacement speed of apices A and A' along the direction of the arrow N and the excitation frequency is a complex non-linear relation.

The surface acoustic wave motor of U.S. Pat. No. 4,562,374 has the advantages of having a relative good efficiency, a small size and a light weight for a determined torque, and of a holding torque when stopped (i.e., in the absence of a signal, the moving part 2 is urged against the fixed part 1 thereby causing a non-negligible friction force between the two parts).

However, a drawback of this motor lies in that its speed can only be controlled by the provision of a sensor and feedback loop system. The same system is necessary when the position of the machine is to be controlled. The use of such sensors and feedback loops makes the motor and of a high cost, which inhibits the advantages of this motor.

To solve this problem, Satoshi Segawa (NEC Res. & Develop., Vol. 33, No. 1, January 1992) proposed to integrate a displacement sensor in the motor itself.

FIG. 2 of the present application reproduces FIG. 1 of the above cited article which concerns an implementation of a motor in which the stator and the rotor are constituted by annular facing parts 11 and 12 urged one against the other by a spring 13. An excitation system constituted by a piezoelectric ceramic 14 is fixed to the rear surface of stator 11 to generate surface acoustic waves therein. A lining 15 and a detecting piezoelectric ceramic ring 16 are successively disposed between the stator ring 11 and the rotor ring 12.

S. Segawa teaches that the compressions that are caused by the surface acoustic waves of the stator and are transmitted by the annular lining 15 to the detecting ring 16 allow the detection of phase shifts between the rotor and the stator, thereby indicating the angular position of the rotor with respect to the stator.

This device has the drawback of being relatively complex because it requires the use of a detector constituted by a specific piezoelectric ring whose various parts should be suitably wired together. Moreover, since this detector cannot be directly applied against the stator, an additional lining must be provided. These various additional parts increase the rotor's inertia and therefore in particular its response time. In addition, the phase detection systems require the use of complex and accurate electronic circuits and, preferably, digital systems as proposed by S. Segawa.

SUMMARY OF THE INVENTION

An object of the present invention is to provide a rotating machine with an annular rotor and an annular stator, in which progressive acoustic waves are generated in the stator, comprising simple means for detecting the relative speed of the rotor and the stator.

A further object of the present invention is to use such a machine as a rotation speed sensor of a shaft associated with the rotor, the rotor being not driven by the stator.

To achieve these objects, in an embodiment of the present invention, the size of the rotor is designed so that vibrations in the stator excite in the rotor vibrations having the same frequency and a lower amplitude when these two parts are fixed one with respect to the other, and the vibrations caused in the rotor by the stator are detected.

According to a first aspect of the invention, the size of the rotor is designed so that the surface acoustic waves have a resonance frequency within the same mode and substantially within the same range as the stator.

According to a second aspect of the invention, the rotor is designed to have a high flexibility (compliance) along a direction perpendicular to its main surface. Thus, deformations applied to the lower surface of the rotor are duplicated on the upper surface.

More particularly, the invention provides a rotating machine comprising two coaxial annular parts rotating one with respect to the other and contacting each other by their facing surfaces. The first part is vibrated to generate progressive surface waves at a frequency within a range of resonance frequencies of a predetermined rank of this first part. The second part is such that the vibrations in the first part generate in the second part vibrations having the same frequency and a smaller amplitude when these two parts are fixed one with respect to the other. A vibration detector is mounted on the second part. A circuit provides a signal corresponding to the difference in frequency between the excitation frequency of the first part and the vibration frequency detected on the second part. This difference corresponding to the relative rotation speed of the two annular parts.

According to an embodiment of the invention, the first part is a stator and the second part is a rotor.

According to a first aspect of the invention, the size of the rotor is such that it provides a resonance frequency for the surface acoustic waves in the same mode and substantially within the same range as the stator.

According to a second aspect of the invention, the rotor is designed so as to have a high flexibility (compliance) along an axial direction. In an embodiment of the invention, the rotor comprises a thin connection sheet between the rotation shaft and rotor ring having a small section, the vibration detector being made of a ceramic disposed on the thin sheet near the ring.

According to an embodiment of the invention, the friction coefficient between the facing parts is high and the difference signal is provided to a first input of a control circuit whose second input receives a reference signal.

According to an embodiment of the invention, the rotating machine constitutes a tachometer and the friction coefficient between the two facing parts is low, the first part being fixed and the second part being integral with a driven shaft whose speed is to be measured.

The foregoing and other objects, features, aspects and advantages of the invention will become apparent from the following detailed description of the present invention when taken in conjunction with the accompanying drawings.

DETAILED DESCRIPTION

Figure 2:
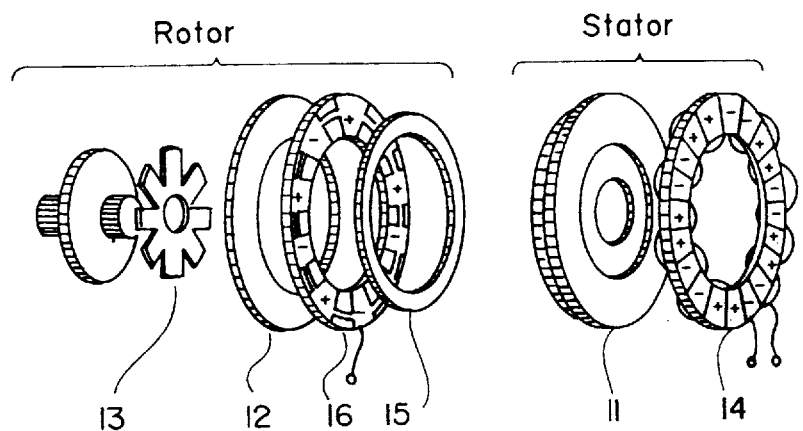
Figure 4:
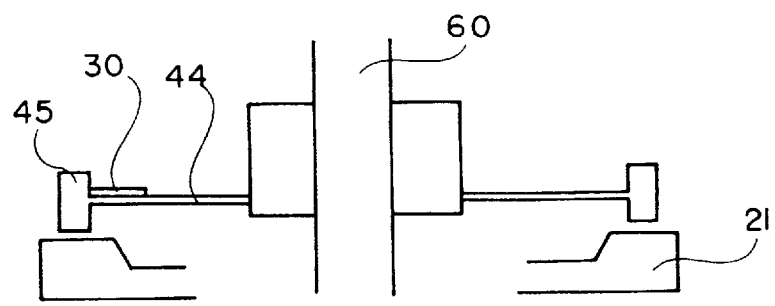
FIG. 4 represents an embodiment of a rotor according to the present invention.
Figure 3:
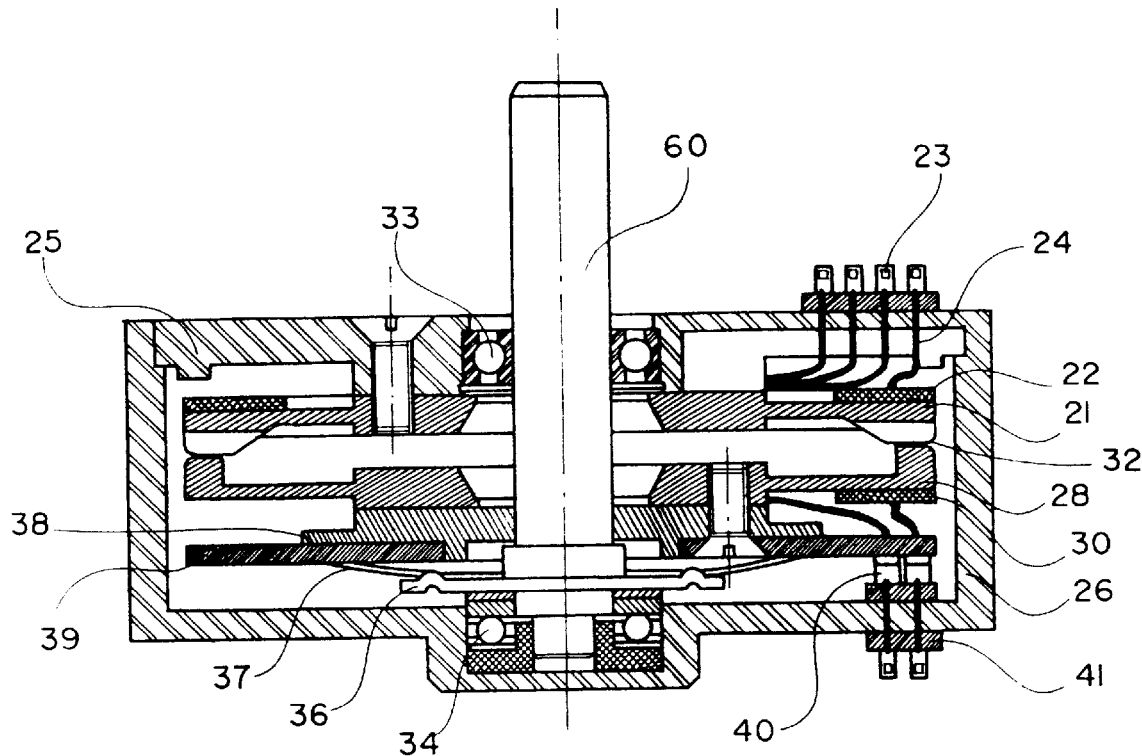
FIG. 3 represents an embodiment of a rotating machine according to the present invention.

FIG. 3 represents a detailed embodiment of a rotating machine according to the present invention which comprises a stator 21, similar to the stator 11 of FIG. 2, whose rear surface is coupled to a piezoelectric driver 22, similar to the driver 14 of FIG. 2. The piezoelectric driver 22 is a multiphase annular element, with alternated polarization comprising, as illustrated in FIG. 4, an auxiliary measurement electrode. This piezoelectric driver is coupled to a terminal block 23 through connection wires 24. The stator 21 is connected to a frame 25 having a cover 26. An annular rotor 28 contacts the stator. A piezoelectric sensor 30 is disposed at at least one point of the periphery of the rotor 28. An optional coating material 32 is disposed on at least one of the facing surfaces of the stator and the rotor. The rotor is connected to a shaft 60 mounted on rollers 33 and 34 that are integral with the frame and its cover, for example by a set of parts comprising a driving disk 36, a spring 37 urging the rotor against the stator, and a disk support 38. In an embodiment, the disk support 38 is connected to a supply disk 39 at the inner surface of which are connected wires receiving the signal of the piezoelectric sensor 30 and whose external surface comprises a collector with sliding brushes 40 providing a signal on a terminal block 41.

This mechanical arrangement is illustrated by way of example only and is liable of various modifications, especially for the parts connecting the rotor to the shaft and for the electrical connection mode between the sensor 30 and the terminal block 41. For example, since the signal of the sensor is a low energy signal available on two wires only, a rotating transformer device can be easily used to avoid the use of a collector system liable to break down.

In conventional piezoelectric rotating machines, such as, for example, the machine described by S. Sagawa, the vibration characteristics of the rotor and especially the progressive surface wave propagation characteristics are not taken into account. The rotor is basically considered as a rigid element liable to be driven by the stator. In fact, in a small-size motor, this rotor cannot be considered as strictly inert and vibrations caused by the vibrations of the stator will unavoidably occur in the rotor. Thus, generally, the rotor has an intrinsic frequency in a predetermined vibration mode strictly distinct from that of the stator. For example, if the stator is excited at 40 kHz in mode 9, the rotor can have any resonance frequency, for example ranging from 30 to 50 kHz, not necessarily in mode 9. The vibrations in the rotor are therefore unrelated, as regards frequency and phase, to the stator's vibrations. Independently of the fact that this does not make it possible to use the speed detection mode of the rotor according to the invention, this causes noise at audible frequencies due to beats between the frequency applied to the stator and the spurious frequencies generated at the rotor. Thus, although a driven piezoelectric motor is theoretically a low-noise motor since the excitation frequencies are high (approximately 40 kHz, i.e. beyond the audible frequencies) and since the rotation frequencies are low (a few runs per minute, i.e. below the audible frequencies), these motors are in fact relatively noisy because, according to the applicant, of the above-mentioned beats.

The present invention provides rotor structures adapted to enhance in the rotor the generation of axial vibrations correlated with the surface waves generated in the stator.

According to a first aspect of the present invention, the size of the rotor and its constitutive material are selected so that the rotor has resonance frequencies, i.e., the possibility of propagating progressive waves, within the same range as the stator but with a lower quality coefficient or resonance factor. For this purpose, a simple solution consists of using a rotor which is substantially similar to the stator with slight differences, such as a different thickness, to slightly shift the resonance frequencies. Thus, when the stator is excited, a progressive wave having the same frequency as and a smaller amplitude than the progressive wave of the stator is caused on the rotor's inner surface facing the stator. The piezoelectric sensor 30 can then detect this wave. The sensor can be a small-size sensor which can be easily wired since it comprises only two outputs and is positioned on the rear surface of the rotor with respect to the stator.

Figure 1:
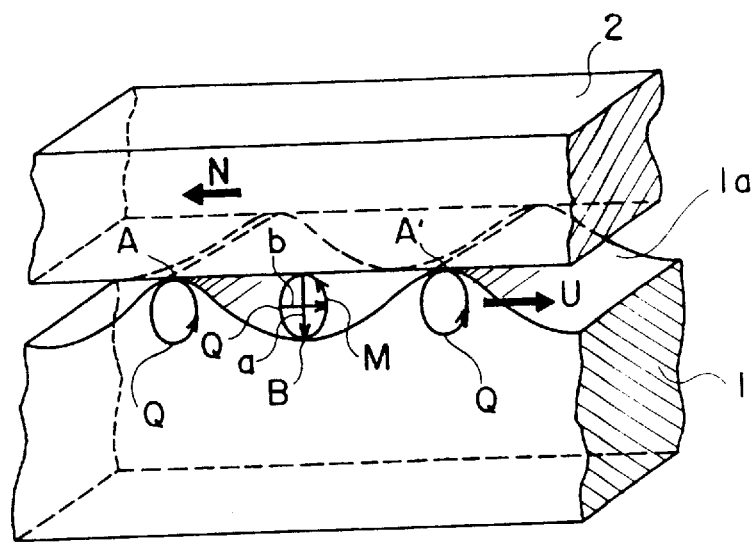
FIGS. 1 and 2, above described, illustrate the state of the art and the problem encountered.

As mentioned above, it is important that the rotor has a quality coefficient or resonance factor, for the desired frequency and mode, non-null but smaller than that of the stator. Otherwise, deformations having substantially the same amplitude would be generated on the stator and the rotor, and the effect described in FIG. 1 might no longer occur since each rising ripple of the rotor would correspond to a falling ripple of the rotor, thereby blocking the rotation.

When the rotor does not rotate, the wave generated in the rotor has the same frequency as the wave in the stator. When the rotor rotates with respect to the stator, the frequencies of the waves generated in the rotor and in the stator are shifted by the relative rotation speed of the rotor with respect to the stator. Thereby, it can be considered that, if the stator is excited at a frequency fs, the signal on the rotor has a frequency fr=fs+F, where F corresponds to the rotation frequency of the rotor. In this relation, it is assumed that F is significantly lower than fs and that the rotor is driven by the stator.

According to a second aspect of the invention, the shape of the rotor is designed so that its flexibility (compliance) along the axial direction is sufficient for the axial vibrations applied to its lower surface to cause a corresponding deformation of its upper surface. This result can be obtained, for example, by using a rotor capable of deformation and having a flexible connection disk between the shaft and the ring or rotor-shaped wheel designed to contact a stator ring.

Such a structure is schematically illustrated in the cross-sectional view of FIG. 4. A stator ring 45, whose size (a few millimeters) and material (such as Dural) are selected to provide the stator ring with a sufficient flexibility along the axial direction is mounted, through a very thin disk or sheet 44 (having a thickness smaller than 1 millimeter) on shaft 60. This flexibility must not be too high so that the rotor can be driven by the stator. The piezoelectric sensor 30 is preferably mounted on the thin sheet 44 close to ring 45.

Figure 5:
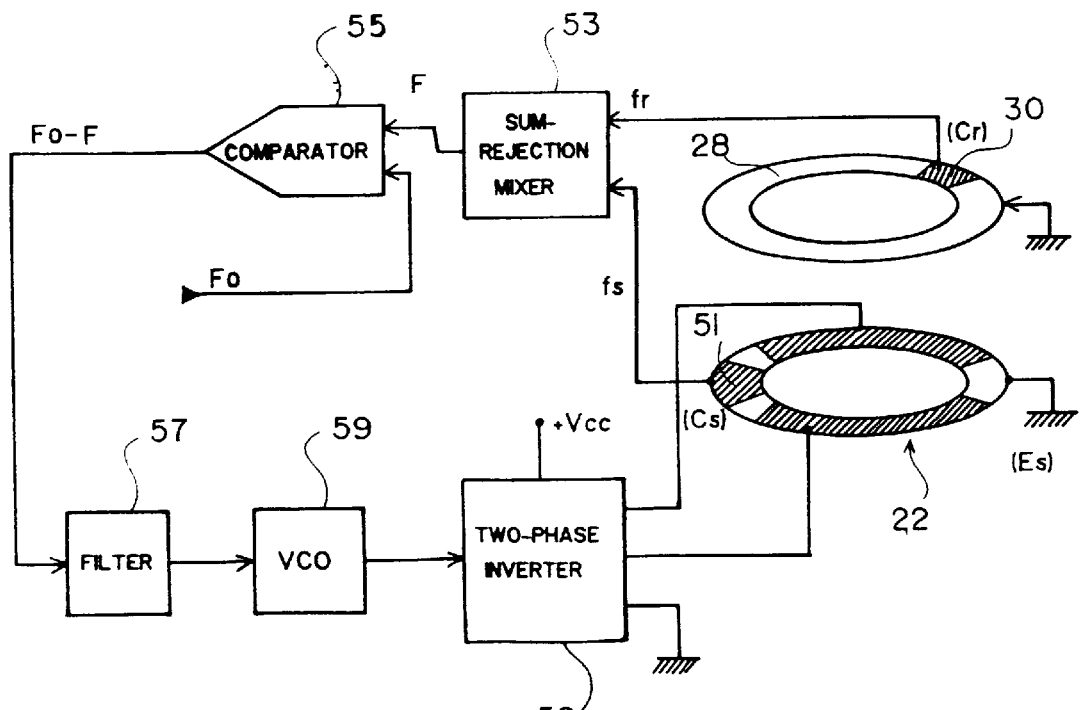
FIG. 5 represents an embodiment of an electronic system adapted to a rotating machine according to the present invention.

FIG. 5 illustrates a way of using the signal received at the rotor.

FIG. 5 represents the exciting ceramic 22 assembled with the stator, and its two-phase excitation signal provided by a two-phase inverter 50. The ceramic 22 further comprises an area 51 corresponding to a detector and providing the signal at a frequency fs from which the stator is excited. The rotor 28 supports a piezoelectric sensor 30 which provides a signal at frequency fr, which, as above-mentioned, because of the selected mechanical and vibratory characteristics of the rotor, is equal to fs+F. A sum rejection mixing circuit 53 provides a signal at frequency F. This signal is provided to a regulation loop to control the frequency provided to the two-phase inverter 50 and to fix, in a control mode, the rotation frequency of the motor. The regulation loop conventionally comprises, for example, a comparator 55 for comparing the frequency F with a reference frequency $F_0$. The error signal is then provided to a filter 57, and to a voltage-controlled oscillator 59 whose outputs are divided by the two-phase inverter to be applied to the exciting ceramic 22.

It will be appreciated that this detection and control mode is particularly simple.

In the prior art, and in the above description, the rotating machine is represented as a motor in which the rotor is driven by the stator.

According to an aspect of the present invention, the coating 32 of the stator or rotor is such that the facing surfaces are highly sliding (they are, for example coated with Teflon). Then, the vibrations of the stator are transmitted to the rotor; however, this rotor is not rotated by the stator. Then, the shaft 60 is designed so as to be rotated by a different machine whose rotation speed has to be measured. Then, the rotor's output signal fr is simply compared with the stator's output signal fs to obtain the signal at the desired frequency F. This constitutes a simple tachometer sensor to which the rotor described according to the first aspect of the invention is particularly well adapted. Also, the rotation direction is determined by the sign of the difference fr−fs.

Although the present invention has been disclosed for speed sensors or tachometer sensors, it is also possible, by means of a more complex electronic circuit, to measure the phase shifts between the stator wave and the rotor wave, which provides position indications as achieved with the prior art devices which, in contrast, are more complex when used to provide speed information.

I claim:

1. A rotating machine comprising two coaxial annular parts rotating one with respect to the other, whose facing surfaces are in contact, the first part (21) being excited so as to vibrate to generate progressive surface waves at a frequency within a range of resonance frequencies of a predetermined rank of said first part, wherein:

the second part (28) is such that the vibrations in the first part generate in the second part vibrations having the same frequency and a smaller amplitude when these two parts are fixed one with respect to the other;

a vibration detector (30) is mounted on the second part;

means (53) are provided for providing a signal (F) corresponding to the difference in frequency between the excitation frequency of the first part and the vibration frequency detected on the second part, said difference corresponding to the relative rotation speed of the two annular parts.

2. The rotating machine of claim 1, wherein the first part is a stator and the second part is a rotor.

3. The rotating machine of claim 2, wherein the size of the rotor is designed so that the surface acoustic waves have a resonance frequency within the same mode and substantially within the same magnitude range as the stator.

4. The rotating machine of claim 2, wherein the rotor is designed to have a high flexibility (compliance) along an axial direction.

5. The rotating machine of claim 4, wherein the rotor includes a thin connection sheet between the rotation shaft and a rotor ring having a small section, the vibration detector being made of ceramic disposed on the thin sheet near the ring.

6. The rotating machine of claim 1, constituting a motor, wherein the friction coefficient between the facing parts is high, and wherein the difference signal is provided to a first input of a control circuit (55, 57, 59, 50) whose second input receives a reference signal ($F_0$).

7. The rotating machine of claim 1, constituting a tachometer, wherein the friction coefficient between the two facing parts is low, the first part (21) being fixed and the second part (28) being integral with a driven shaft (32) whose speed is to be measured.

* * * * *